(12) United States Patent
Dowe

(10) Patent No.: US 6,443,637 B1
(45) Date of Patent: Sep. 3, 2002

(54) CAMERA WITH ELECTROSTATIC LIGHT VALVE THAT FUNCTIONS AS DIAPHRAGM

(75) Inventor: David R. Dowe, Holley, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/526,332

(22) Filed: Mar. 15, 2000

(51) Int. Cl.[7] .................. G03B 9/02; G03B 7/085; G03B 7/095
(52) U.S. Cl. .................. 396/505; 296/257; 296/261
(58) Field of Search .................. 396/257, 261, 396/262, 505, 506, 457; 359/230, 231, 280, 281

(56) References Cited

U.S. PATENT DOCUMENTS

| | | |
|---|---|---|
| 3,682,058 A | 8/1972 | Wada |
| 3,683,776 A | 8/1972 | Ono |
| 3,989,357 A * | 11/1976 | Kalt ............................ 359/231 |
| 4,234,245 A | 11/1980 | Toda et al. |
| 4,248,501 A | 2/1981 | Simpson |
| 4,322,153 A | 3/1982 | Katayama et al. |
| 4,422,729 A * | 12/1983 | Suzuki et al. ............... 359/245 |
| 4,561,744 A | 12/1985 | Rietbrock et al. |
| 4,584,056 A | 4/1986 | Perret et al. |
| 4,704,707 A | 11/1987 | Simpson |
| 4,763,142 A | 8/1988 | Saitoh et al. |
| 5,032,005 A | 7/1991 | Woodruff |
| 5,233,459 A | 8/1993 | Bozler et al. |
| 5,459,602 A | 10/1995 | Sampsell |
| 5,499,070 A | 3/1996 | Miura |
| 5,519,240 A | 5/1996 | Suzuki |
| 5,552,925 A | 9/1996 | Worley |
| 5,579,149 A | 11/1996 | Moret et al. |
| 5,646,770 A | 7/1997 | Sato et al. |
| 5,739,942 A | 4/1998 | Furlani et al. |
| 5,781,331 A | 7/1998 | Carr et al. |
| 5,784,189 A | 7/1998 | Bozler et al. |

* cited by examiner

Primary Examiner—Russell Adams
Assistant Examiner—Arthur A Smith
(74) Attorney, Agent, or Firm—Roger A. Fields

(57) ABSTRACT

The diaphragm for an objective lens in a camera includes a circular series of coilable resilient opaque electrodes that are biased to curl into respective coils radially outward to make the size of an aperture larger and are electrostatically actuatable to uncurl from the coils radially inward to make the size of the aperture smaller, a transparent flat stationary electrode that is positioned parallel to the coilable electrodes when the coilable electrodes are uncurled from the coils, a peripheral conductor that encircles the coilable electrodes and has respective conductive connections to each one of the coilable electrodes, and one conductive lead attached to the peripheral conductor and another conductive lead attached to the stationary electrode for together applying an electric potential between the coilable electrodes and the stationary electrode to electrostatically actuate the coilable electrodes to uncurl.

14 Claims, 5 Drawing Sheets

CAMERA WITH ELECTROSTATIC LIGHT VALVE THAT FUNCTIONS AS DIAPHRAGM

CROSS REFERENCE TO RELATED APPLICATIONS

Reference is made to commonly assigned copending applications Ser. No. 09/526,190, entitled CAMERA WITH ELECTROSTATIC LIGHT VALVE THAT FUNCTIONS AS IMAGE REFLECTING MIRROR FOR VIEWFINDER and filed Mar. 15, 2000 in the name of David R. Dowe, and Ser. No. 09/526,709, entitled CAMERA WITH ELECTROSTATIC LIGHT VALVE THAT FUNCTIONS AS VARIABLE FORMAT MASK IN VIEWFINDER and filed Mar. 15, 2000 in the name of David R. Dowe.

FIELD OF THE INVENTION

The invention relates generally to the field of photography, and in particular to cameras. More specifically, the invention relates to a camera with an electrostatic light valve (ELV) that functions as a diaphragm.

BACKGROUND OF THE INVENTION

Diaphragm

The diameter of a given bundle of light rays passing through an objective lens in a camera determines the brightness of the image formed at the film plane. The maximum diameter of this bundle of light rays depends on the optical diameter of the lens. By placing opaque plates with holes of various sizes, or a set of opaque leaves to form an adjustable aperture, in the light path of the lens, it is possible to adjust the diameter of the bundle of light rays, and hence the intensity of illumination of the image formed at the film plane. The device with such a hole is commonly known as a diaphragm. A small hole formed by the diaphragm lets less light through the lens than a large one, so the size of the hole can be used to alter the exposure at the film plane.

In a lens which has only one optical element, the diaphragm may be placed in front or behind the optical element. The position affects the distortion of the image formed at the film plane: if in front, it tends to produce barrel distortion, and if behind, it tends to produce pin-cushion distortion. In a lens with several optical elements, the diaphragm is typically placed between two of the optical elements—e.g., a symmetrical lens has the diaphragm inserted midway between each of the identical elements (in the exact center of the lens).

The most common type of diaphragm is the variable opening or iris diaphragm. The hole in this type is formed by a circular series of thin opaque leaves. Movement of a control closes the leaves inward or opens them out to make the hole smaller or larger. Usually, the f-number of the resulting aperture is indicated on a scale alongside the control. The greater the number of leaves in the iris diaphragm, the more nearly the hole approaches a perfectly circular shape. However, a truly circular hole is by no means essential for every photography.

On modern automatic cameras, adjustment of the diaphragm to vary the size of the aperture is often controlled by an exposure meter which measures light intensity. The light measurement provided by the light meter is used to move the leaves of the diaphragm to form different size apertures. This takes place immediately before a shutter is opened to initiate the exposure. The speed of the shutter (which determines the duration of the exposure) also is derived from the measurement provided by the light meter.

Electrostatic Light Valve

An electrostatic light valve (ELV) consists of a transparent flat stationary electrode, a movable coil-biased resilient sheet electrode, and an insulating layer separating the two stationary and coilable electrodes. The coilable electrode has one end that is fixed with respect to the stationary electrode and a free end that is innermost within the coil when the coilable electrode is coiled. The coilable electrode is caused to unroll (uncurl) along the stationary electrode to overlay the stationary electrode when an electric potential (voltage) is applied between the two electrodes. As long as the electric potential is applied, the coilable electrode remains unrolled along the stationary electrode. Conversely, when the electric potential is discontinued the coilable electrode is reversed along the stationary electrode to re-coil (re-curl). The coilable electrode can thus act as an electrostatically actuated light valve or light shutter. This is disclosed in prior art U.S. Pat. No. 4,248,501 issued Feb. 3, 1981, U.S. Pat. No. 4,704,707 issued Nov. 3, 1987, U.S. Pat. No. 5,233,459 issued Aug. 3, 1993 and U.S. Pat. No. 5,784,189 issued Jul. 21, 1998. The prior art patents are incorporated in this application.

THE CROSS-REFERENCED APPLICATIONS

Cross-referenced application Ser. No. 09/526,190 discloses a camera with an electrostatic light valve (ELV) that functions as an image reflecting mirror for a viewfinder.

Cross-referenced application Ser. No. 09/526,709 discloses a camera with an electrostatic light valve (ELV) that functions as a variable format mask in a viewfinder.

SUMMARY OF THE INVENTION

According to one aspect of the invention, a camera comprising an objective lens for forming an image of a subject by focusing rays of light at a film plane, and a diaphragm for forming a variable size aperture for the lens that changes the amount of light from the lens, is characterized in that:

the diaphragm has a series of coilable light valves constructed to curl into respective coils and to uncurl from the coils to change the size of the aperture.

According to another aspect of the invention, a method in a camera of adjusting a diaphragm to vary the size of an aperture for an objective lens, in order to change the amount of light that can pass through the objective lens, is characterized by the steps of:

curling a series of coilable light valves into respective coils to make the size of the aperture larger so that more light can pass through the objective lens; and uncurling the coilable light valves from the coils to make the size of the aperture smaller so that less light can pass through the objective lens.

Preferably, the diaphragm for the objective lens includes a circular series of coilable resilient opaque electrodes that are biased to curl into respective coils radially outward to make the size of the aperture larger and are electrostatically actuatable to uncurl from the coils radially inward to make the size of the aperture smaller, a transparent flat stationary electrode that is positioned parallel to the coilable electrodes when the coilable electrodes are uncurled from the coils, a peripheral conductor that encircles the coilable electrodes and has respective conductive connections to each one of the coilable electrodes, and one conductive lead attached to the peripheral conductor and another conductive lead attached to the stationary electrode for together applying an electric potential between the coilable electrodes and the stationary electrode to electrostatically actuate the coilable electrodes to uncurl.

Thus, the invention preferably uses an electrostatic light valve(ELV) in a camera to function as a diaphragm for an objective lens,

DETAILED DESCRIPTION OF THE INVENTION

The invention is disclosed as being embodied preferably in a camera, and includes an electrostatic light valve (ELV). Because the features of a camera and an ELV are generally known, the description which follows is directed in particular only to those elements forming part of or cooperating directly with the disclosed embodiment. It is to be understood, however, that other elements may take various forms known to a person of ordinary skill in the art.

Figure 1:
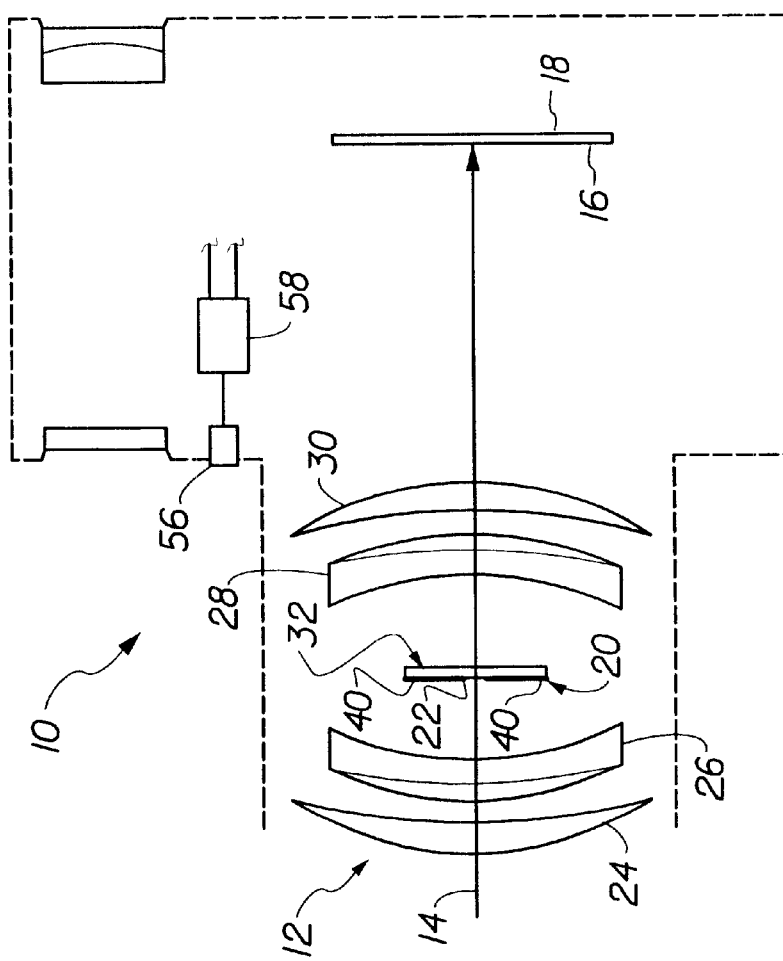
FIG. 1 is a side-elevation interior view of a camera with an electrostatic light valve (ELV) that functions a diaphragm for an objective lens, in a preferred embodiment of the invention, showing a series of coilable electrodes of the ELV uncurled (uncoiled) from respective coils to provide a relatively small aperture.
Figure 2:
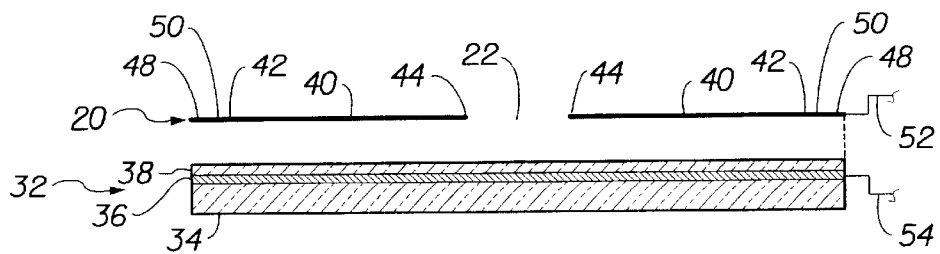
FIG. 2 is a partially assembled section view of the ELV, showing the coilable electrodes uncurled.
Figure 3:
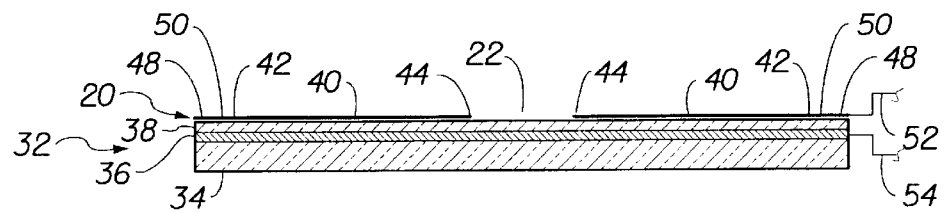
FIG. 3 is an assembled section view of the ELV similar to FIG. 2.
Figure 7:
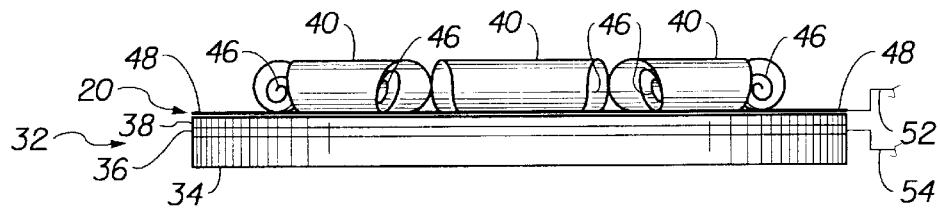
FIG. 7 is an assembled elevation view of the ELV, showing the coilable electrodes re-curled.
Figure 4:
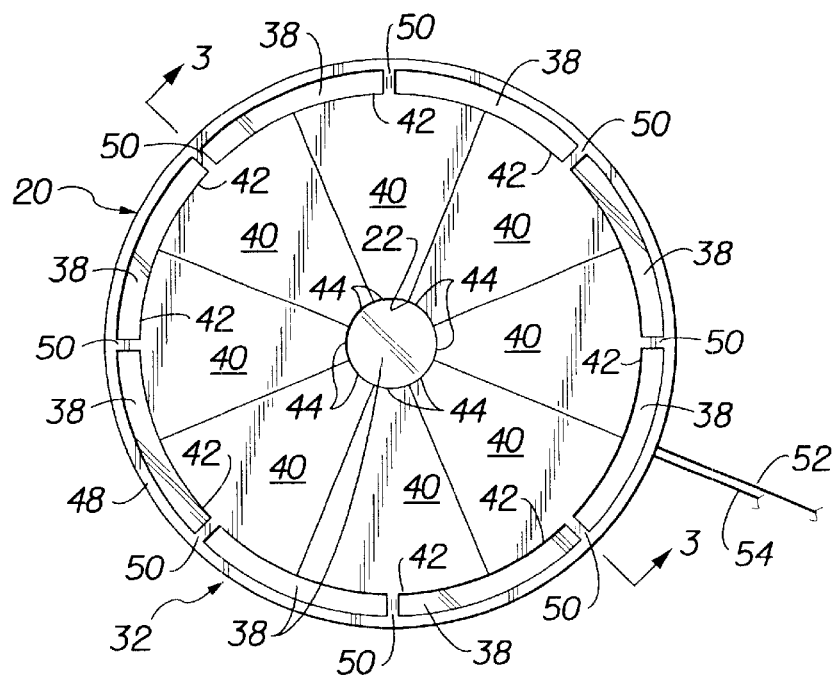
FIG. 4 is a plan view of the ELV, showing the coilable electrodes uncurled.
Figure 5:
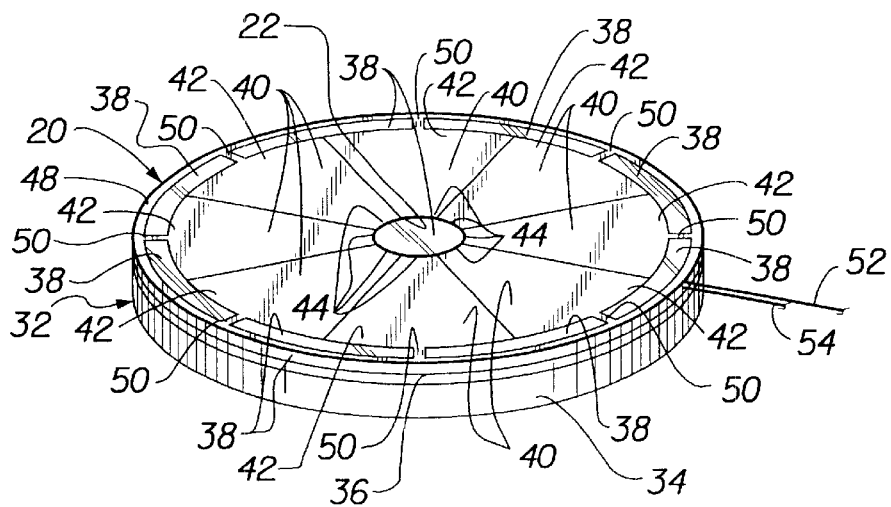
FIG. 5 is a top perspective view of the ELV as shown in FIG. 4.
Figure 6:
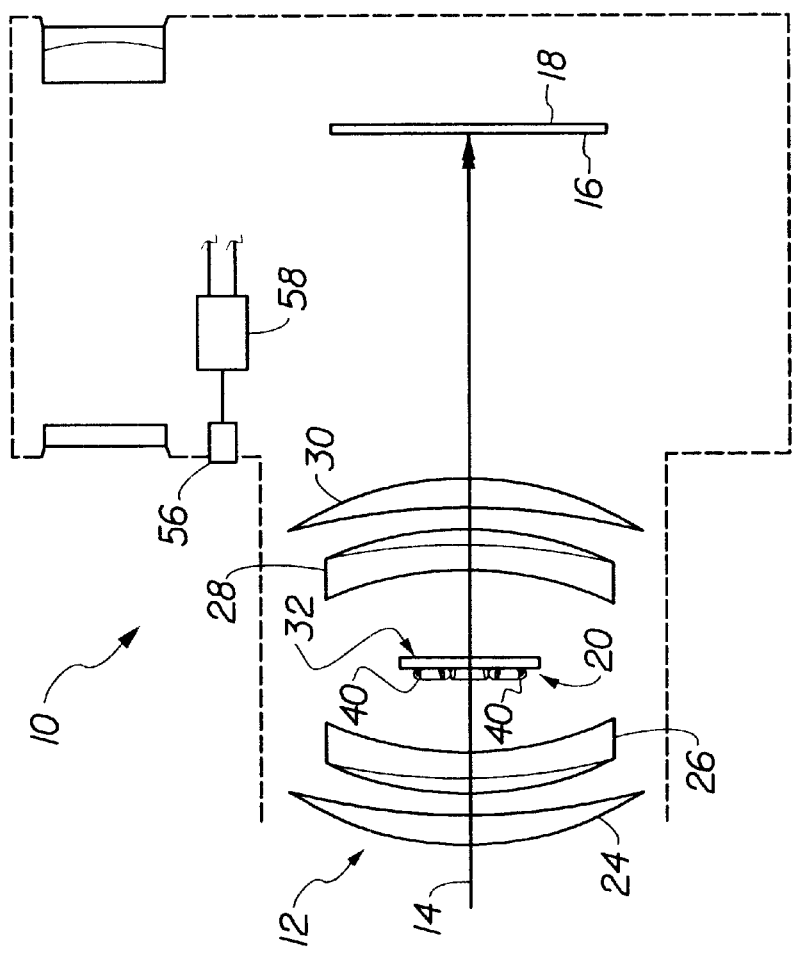
FIG. 6 is a side-elevation interior view of the camera, showing the coilable electrodes re-curled (re-coiled) into the coils.
Figure 8:
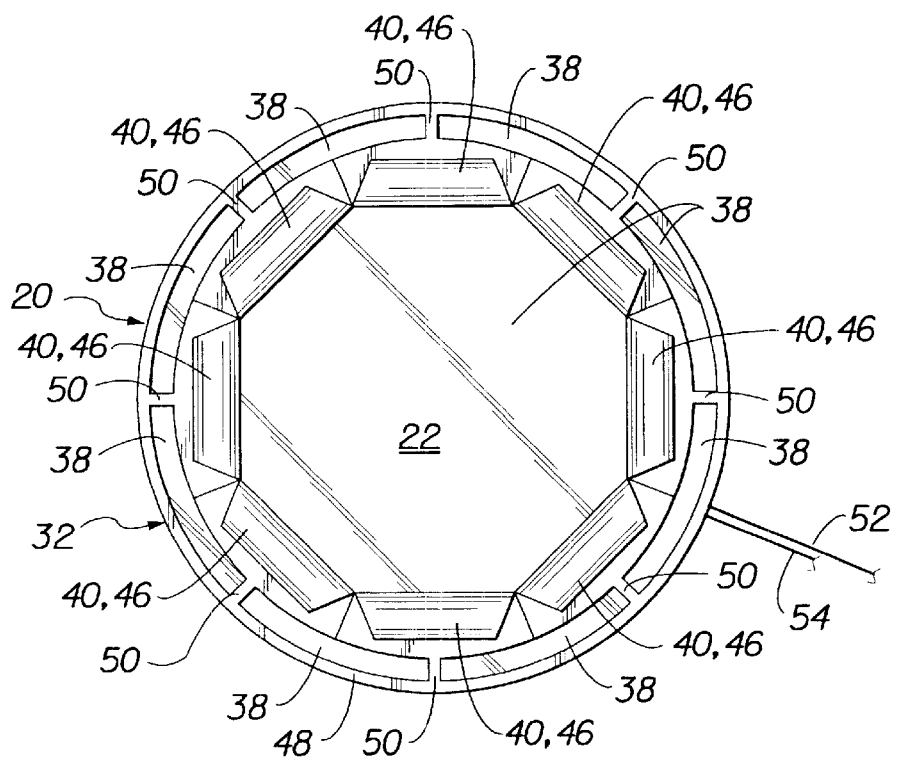
FIG. 8 is a plan view of the ELV, showing the coilable electrodes uncurled.
Figure 9:
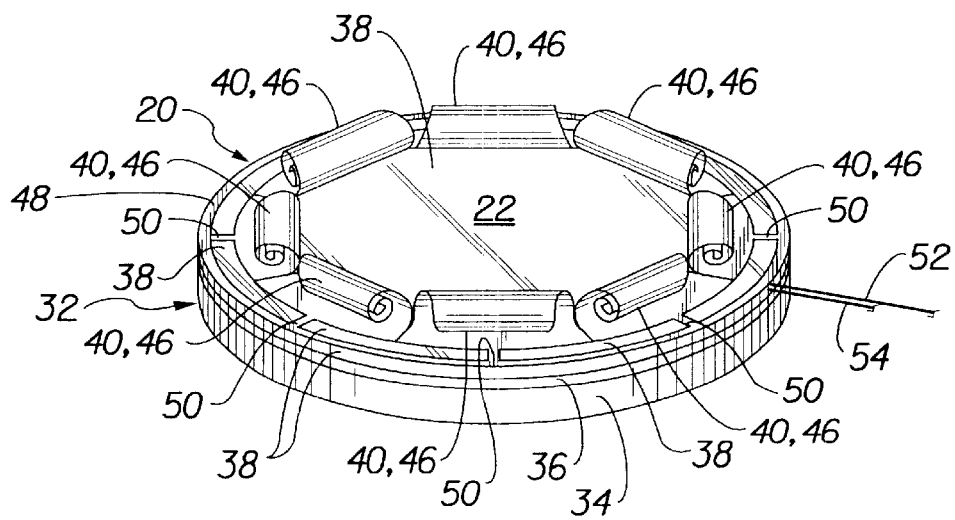
FIG. 9 is a top perspective view of the ELV as shown in FIG. 8.

Referring now to the drawings, FIG. 1 schematically shows a camera 10 including a known-type objective or front taking lens 12 which forms an image of the subject by focusing rays of light 14 reflected from the subject on a film plane 16 defined by a known-type pressure platen 18, and a diaphragm 20 for forming a variable size aperture 22 for the lens that changes the amount of light passing through the lens.

The objective lens 12 has an even number (4) of symmetrical elements 24, 26, 28 and 30, and the diaphragm 20 is positioned midway between the optical elements (in the exact center of the lens). However, depending on the number and arrangement of the optical elements that make up the objective lens, the position of the diaphragm would be changed in a known manner.

The diaphragm 20 is an electrostatic light valve (ELV) device 32 as shown in FIGS. 1–9 that includes a transparent flat stationary glass substrate 34, positioned parallel to the film plane 16, which is coated with a thin transparent conductive layer such as 1000–3000 Å indium tin oxide (ITO). The thin transparent conductive layer forms a transparent flat stationary electrode 36 which is fixed parallel to the film plane 16. A thin transparent insulative (high resistive) layer 38 such as 50–5000 Å silicon dioxide coats the stationary electrode 36. See FIG. 2. Further details of this assembly are disclosed in prior art U.S. Patents No. 5,233,459 issued Aug. 3, 1993 and U.S. Pat. No. 5,784,189 issued Jul. 21, 1998. A series of identical opaque coilable resilient electrodes 40 are arranged in a circle about the aperture 22, and each one of them is tapered from an outer end 42 fixed with respect to the stationary electrode 36 to an inner free end 44 that is movable to vary the size of the aperture 22. The coilable electrodes 40 are biased to curl radially outward into individual coils 46 on the stationary electrode 36, beginning at their free ends 44 to make the size of the aperture 22 larger as shown in FIGS. 6–9, and are electrostatically actuatable to uncurl (unroll) radially inward from the coils along the stationary electrode to overly (be parallel to) the stationary electrode and make the size of the aperture smaller as shown in FIGS. 1 and 3–5. A peripheral conductor 48 encircles the coilable electrodes 40 and has respective identical conductive connections 50 to each one of the coilable electrodes. One conductive lead 52 is attached to the peripheral conductor 48 and another conductive lead 54 is attached to the stationary transparent electrode 36 for together applying an electric potential (voltage) between the coilable electrodes 40 and the stationary electrode to electrostatically actuate the coilable electrodes to uncurl. Prior art U.S. Pat. No. 4,248,501 issued Feb. 3, 1981, as well as the '459 and '189 patents, teach the application of an electric potential to electrostatically actuate an ELV device.

The electric potential to electrostatically actuate the coilable electrodes 40 to uncurl, in order to make the size of the aperture 22 smaller as shown in FIGS. 1 and 3–5, is controlled via a known exposure meter 56 such as a silicon photodiode and an integrated amplifier. As is typical, the exposure meter 56 senses ambient light to provide a measure of the light intensity. This measure is used in a known automatic exposure control 58 to vary the electric potential to be applied between the coilable electrodes 40 and the stationary electrode 36. Thus, the coilable electrodes 40 are electrostatically actuated to uncurl in proportion to the intensity of ambient light.

When the electric potential is discontinued, the restitution force (bias) of the coilable electrodes 40 will re-curl the coilable electrodes into the respective coils 46.

A method of operating the ELV device 32 in the camera 10 is as follows. Before making an exposure, the electric potential is applied to the stationary electrode 36 and the coilable electrodes 40 via the exposure meter 56 and the automatic exposure control 58. The coilable electrodes 40 then uncurl from the respective coils 46 to vary the size of the aperture 22 in accordance with the intensity of ambient light. When a known release button (not shown) is manually depressed to initiate the exposure, a shutter (not shown) is opened and re-closed to effect the exposure. The closure of the shutter discontinues the electric potential. The coilable electrodes 40 then re-curl into the respective coils 46.

The invention has been described with reference to a preferred embodiment. However, it will be appreciated that variations and modifications can be effected by a person of ordinary skill in the art without departing from the scope of the invention.

PARTS LIST 10. camera
12. objective lens
14. light rays
16. film plane
18. pressure platen
20. diaphragm 22. aperture
24. lens element
26. lens element
28. lens element
30. lens element
32. ELV device
34. transparent glass substrate
36. stationary electrode
38. transparent insulative layer
40. coilable electrode
42. outer fixed end
44. inner free end
46. coils
48. peripheral conductor
50. conductive connections
52. conductive lead
54. conductive lead
56. exposure meter
58. automatic exposure control

What is claimed is:

1. A camera comprising an objective lens for forming an image of a subject by focusing rays of light at a film plane, and a diaphragm for forming a variable size aperture for said lens that changes the amount of light from said lens, is characterized in that:

said diaphragm has a series of coilable light valves constructed to curl into respective coils and to uncurl from said coils to change the size of said aperture.

2. A camera as recited in claim 1, wherein said coilable light valves are arranged in a circle to curl into said coils radially and to uncurl from said coils radially.

3. A camera as recited in claim 2, wherein said coilable light valves when uncurled radially make the size of said aperture smaller and when curled radially make the size of said aperture larger.

4. A camera as recited in claim 3, wherein said coilable light valves when uncurled radially to make the size of said aperture smaller are similarly tapered toward the aperture.

5. A camera as recited in claim 1, wherein said coilable light valves are arranged in a circle about said aperture and each one of them is tapered from an outer fixed end to an inner free end that is movable to vary the size of said aperture.

6. A camera as recited in claim 1, wherein said coilable light valves include respective coilable resilient opaque electrodes that are biased to curl into said coils and are electrostatically actuatable to uncurl from said coils.

7. A camera as recited in claim 6, wherein said coilable light valves include a transparent flat stationary electrode that is positioned parallel to said film plane, and said coilable electrodes are parallel to said stationary electrode hen the coilable electrodes are uncurled from said coils.

8. A camera as recited in claim 6, wherein said coilable electrodes are arranged in a circle to curl into said coils radially outward to make the size of said aperture larger and to uncurl from said coils radially inward to make the size of said aperture smaller and are similarly tapered toward said aperture when uncoiled radially inward.

9. A camera as recited in claim 6, wherein said coilable electrodes are arranged in a circle to curl into said coils radially and to uncurl from said coils radially, a peripheral conductor encircles said coilable electrodes and has respective conductive connections to each one of said coilable electrodes, and a conductive lead is attached to said peripheral conductor for electrostatically actuating said coilable electrodes to uncoil.

10. A camera as recited in claim 1, wherein said lens has a number of optical elements, and said coilable light valves are located between two of said optical elements.

11. A method in a camera of adjusting a diaphragm to vary the size of an aperture for an objective lens, in order to change the amount of light that can pass through the objective lens, is characterized by the steps of:

curling a series of coilable light valves into respective coils to make the size of the aperture larger so that more light can pass through the objective lens; and uncurling the coilable light valves from the coils to make the size of the aperture smaller so that less light can pass through the objective lens.

12. A method as recited in claim 11, wherein the step of uncurling the coilable light valves includes applying an electric potential between a transparent flat stationary electrode and opaque resilient coilable electrodes biased to curl into the coils, in order to electrostatically actuate the coilable electrodes to uncurl from the coils along the stationary electrode.

13. A camera comprising an objective lens for forming an image of a subject by focusing rays of light, and a diaphragm for forming a variable size aperture for said lens that changes the amount of light from said lens, is characterized in that:

said diaphragm includes a circular series of coilable resilient opaque electrodes that are biased to curl into respective coils radially outward to make the size of said aperture larger and are electrostatically actuatable to uncurl from said coils radially inward to make the size of said aperture smaller, a transparent flat stationary electrode that is positioned parallel to said coilable electrodes when the coilable electrodes are uncurled from said coils, a peripheral conductor that encircles said coilable electrodes and has respective conductive connections to each one of said coilable electrodes, and one conductive lead attached to said peripheral conductor and another conductive lead attached to said stationary electrode for together applying an electric potential between said coilable electrodes and said stationary electrode to electrostatically actuate the coilable electrodes to uncurl.

14. A camera comprising an objective lens for forming an image of a subject by focusing rays of light at a film plane, and a diaphragm for forming a variable size aperture for said lens that changes the amount of light from said lens, is characterized in that:

said diaphragm includes a transparent flat stationary electrode that is positioned parallel to said film plane, and a circular series of coilable resilient opaque electrodes each one of which is tapered from an outer end fixed with respect to said stationary electrode to a inner free end that is movable to vary the size of said aperture.

* * * * *